United States Patent [19]

McDonald

[11] Patent Number: 4,707,016
[45] Date of Patent: Nov. 17, 1987

[54] TAILGATE CAP AND COVER ASSEMBLY

[75] Inventor: Dean McDonald, Grand Blanc, Mich.

[73] Assignee: Durakon Industries, Inc., Lapeer, Mich.

[21] Appl. No.: 20,628

[22] Filed: Mar. 2, 1987

[51] Int. Cl.⁴ ............................................. B62D 33/02
[52] U.S. Cl. .................................. 296/39 R; 296/57 R
[58] Field of Search ..................... 296/39 R, 50, 57 R; 224/42-42 R

[56] References Cited

U.S. PATENT DOCUMENTS

| 3,900,118 | 8/1975 | Kellogg | 296/39 R |
| 4,047,749 | 9/1977 | Lambitz et al. | 296/39 R |
| 4,111,481 | 9/1978 | Nix et al. | 296/39 R |
| 4,540,214 | 9/1985 | Wagner | 296/39 R |

Primary Examiner—Robert R. Song
Attorney, Agent, or Firm—Cullen, Sloman, Cantor, Grauer, Scott & Rutherford

[57] ABSTRACT

A decorative cap and cover assembly for use on a pickup truck tailgate to protect the tailgate and improve the truck's appearance. The assembly has a decorative cap that hooks over the tailgate and is configured to bend over at least the outer panel of the tailgate. A locking joint interconnects the adjacent ends of the cap and cover. To install the assembly, the cap is hung over the upper portion of a tailgate with at least one screw driven into the tailgate through the bottom portion of the cover.

20 Claims, 3 Drawing Figures

U.S. Patent  Nov. 17, 1987  4,707,016
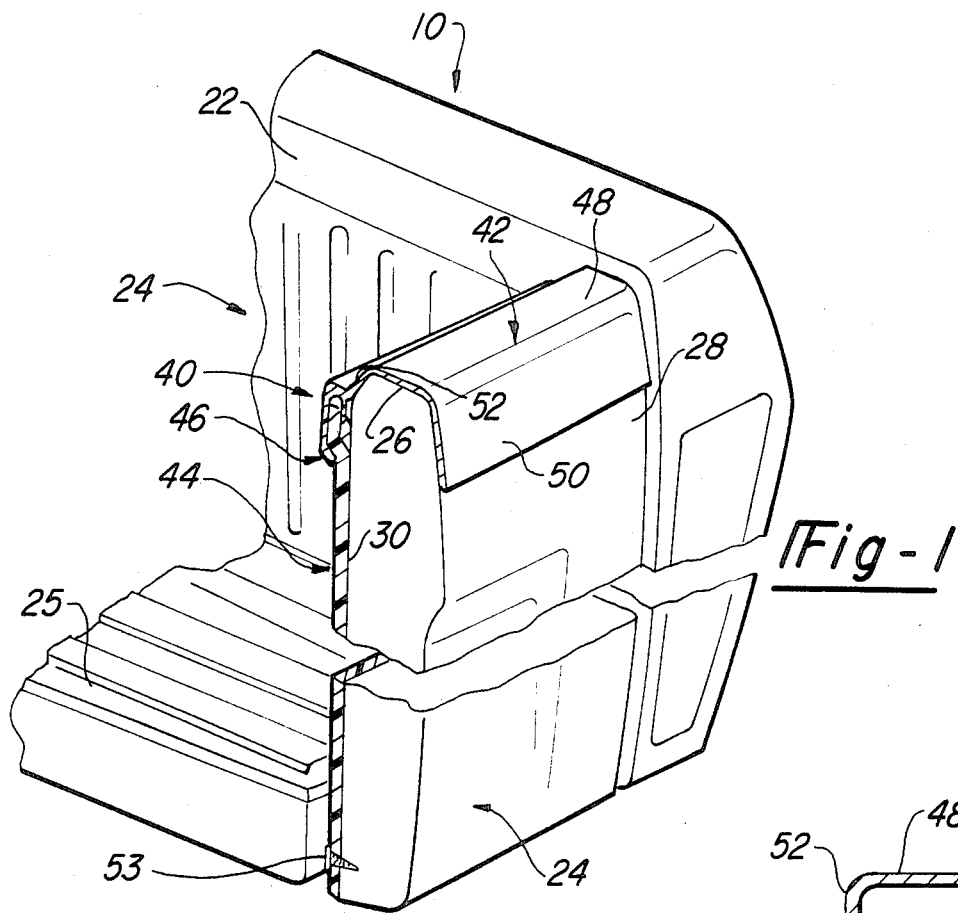
Fig-1
Fig-3
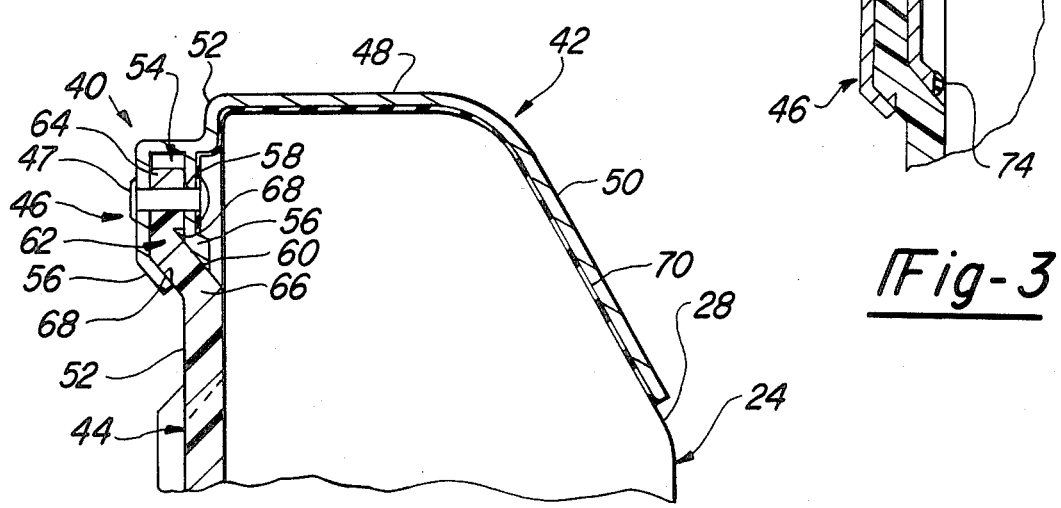
Fig-2

TAILGATE CAP AND COVER ASSEMBLY

BACKGROUND OF THE INVENTION

The present invention relates to a decorative cap and tailgate cover for use on the tailgate of a pick-up truck and more particularly to a decorative cap and tailgate assembly that is easy to assemble and install.

Tailgate covers are commonly used in conjunction with truck bed liners to protect and decorate the cargo area of the pick-up truck. The cover is generally made of plastic and is vacuum formed to the general shape of the inside panel of the tailgate. To install the cover, several sheet metal screws are driven through the cover and into the tailgate. The screws are typically placed along the top and bottom edges of the cover with the top row of screws being clearly visible which detracts from the covers' appearance. Further, unless a seal is provided between the top edge of the cover and the tailgate water can enter and accumulate between the two.

Thus, the present invention relates to a tailgate cover and decorative cap assembly that is easy to assemble and install and improves the appearance of the pick-up truck. It is, therefore, an object of the present invention to provide a tailgate cover that requires a minimum number of sheet metal screws for securement. Further, it is an object of the present invention to provide a tailgate cap and cover assembly that eliminates the need for a top row of screws. Further, it is an object of the present invention to provide a tailgate cap and cover assembly that is interlocked to prevent water from accumulating between the cover and tailgate. It is a still further object of the present invention to provide a tailgate cap and cover assembly that adds further decoration to the pick-up truck.

SUMMARY OF THE INVENTION

The cap and cover assembly of the present invention is adapted to be mounted to the tailgate of a pick-up truck so that the tailgate cover is automatically aligned, requires a minimal amount of fasteners and eliminates the accumulation of water between the liner and tailgate. The decorative cap is preferably chrome plated. It has a top and downwardly extending sides which substantially conform to the contours of the upper portion of the tailgate. A locking channel extends from the inner side of the cap to interconnect the cap with the cover. The channel has an upper portion which is substantially parallel to the tailgate and an inwardly angled lower portion.

The tailgate cover is preferably made of vacuum formed plastic and has an offset upper edge. This edge is configured to fit within the locking channel of the cap. The edge includes first and second sections which are adapted to fit within the upper and lower portions of the locking channel.

To assemble the cap and cover, the cover is slid into the locking channel until the side edges of each are aligned. This temporarily holds the assembly together so that fastening means, such as rivets, can be used to fixedly secure the two members. Additionally, barbs may be provided on the walls of the locking channel to penetrate the panel as it is slid into the locking channel to provide further securement.

To install the assembly, the cap is hung over the tailgate and sheet metal screws are driven into the tailgate through the lower portion of the cover. Screws are not needed along the top edge of the cover. In the preferred embodiment of the invention, a gasket member is provided between the decorative cap and the tailgate to prevent corrosion of the tailgate due to the dissimilar material of the decorative cap. Of course, if the decorative cap is of the same material, the gasket is not necessary. Further, a rubber bead may be provided between the inner wall of the locking joint and the tailgate to prevent corrosion and to further prevent the ingress of water between the cover and tailgate.

Other advantages and meritorious features of the present invention will be more fully understood from the following description, the appended claims, and the drawings, a brief description of which follows.

BRIEF DESCRIPTION OF THE DRAWINGS

FIG. 1 is a fragmentary perspective view of a pick-up truck illustrating the tailgate cap and cover assembly of the present invention.

FIG. 2 is a cross-section of the tailgate cap and cover assembly of the present invention mounted onto a tailgate.

FIG. 3 is a partial cross-sectional view of a further embodiment of the present invention.

DETAILED DESCRIPTION OF THE INVENTION

Referring now to the drawings, FIG. 1 illustrates a conventional pick-up truck 10 having a truck bed or cargo compartment 24. Truck bed 24 includes a floor 25, side walls 22 and a tailgate 24. Tailgate 24 is a conventional pick-up truck tailgate having a top portion 26, an outer panel 28 and an inner panel 30.

Mounted to the tailgate is the decorative cap and tailgate cover assembly 40 of the present invention. Assembly 40 includes a decorative cap 42, preferably chrome plated, and a tailgate cover 44, preferably made of vacuum formed plastic. Decorative cap 42 and cover 44 are interlocked at locking joint 46 and fixed in the locked position by rivets 47.

The decorative cap 40 is configured to conform to the contour of tailgate 24. Cap 40 has a top 48 and downwardly extending sides 50 and 52 which partially cover the upper portion of tailgate 24. As illustrated in FIG. 2, the outer side 50 of cap 42 is bent over the outer panel 28 of tailgate 24 and the inner side 52 of cap 42 is bent over the inner panel 30. In this manner, the cap can be hung over the top portion of tailgate 24 which automatically aligns cover 44 on tailgate 24 so that fastening screws 53 may be used to secure the assembly to the tailgate 24.

Extending from the inner section 52 of cap 40 is a locking channel 54 which forms one half of the locking joint 46. Locking channel 54 is defined by two spaced walls 56 and has a first channel section 58 that is substantially parallel to the tailgate and a second channel section 60 that is angled in the direction of the tailgate.

The second half of locking joint 46 or locking tongue 62 is formed at the upper edge of cover 44. Locking tongue 62 has two portions shaped complimentary to channel 54. The first portion 64 is substantially parallel to the tailgate and is received within first section 58 of channel 54. The second portion 66 is angled for receipt by second section 60 of channel 54.

To assemble the cap and cover assembly 40, locking tongue 62 is aligned with the corresponding sections of locking channel 54 and slid into channel 54. To provide further locking action, barbs 68 may be provided to penetrate cover 44 as it is being slid into channel 54. For fixing the cap and cover in the locked position, a riveting machine can be used to install rivets 47 through the walls 56 and tongue 62.

To install assembly 40 of the present invention, the decorative cap 42 is hung over the upper portion of tailgate 24 which automatically positions cover 44 on inner panel 30. Once the cap is hung over the tailgate, one or more sheet metal screws 53 may be screwed into the bottom portion of cover 44. Screws 53 are hidden by the floor 25 of cargo compartment 24 and do not detract from the covers appearance. A gasket 70 may be provided between cap 42 and tailgate 24 to prevent corrosion.

With reference to FIG. 3, a rubber seal or bead 74 is provided to further seal the assembly. The cap and cover combination provides an effective barrier from the ingress of water to the area between the cover and tailgate. However, since the ends of the assembly are open, there is the possibility that water may be able to enter at the ends. Therefore bead 74 is provided as additional protection against the ingress of water. Bead 74 further acts to protect against corrosion of the cap and tailgate.

It will apparent to those skilled in the art that the foregoing disclosure is exemplary in nature rather than limiting, the invention being limited only by the appended claims.

What is claimed is:

1. A cap and cover assembly adapted to be mounted to the tailgate of a pick-up truck,
    said cap having a top and downwardly extending sides that substantially conform to the contours of the upper portion of the tailgate and a locking channel;
    said cover having locking means at its upper portion configured to slide within said locking channel for securement thereto;
    whereby, said cap and cover interlock such that said assembly can be readily mounted to a pick-up truck tailgate to protect and decorate the tailgate.

2. The cap and cover assembly of claim 1, wherein said locking channel includes opposed downwardly extending walls defining a continuous channel having an upper portion substantially parallel to said tailgate and an inwardly angled lower portion.

3. The cap and cover assembly of claim 2, wherein at least one of said walls includes at least one barb adapted to penetrate said cover when said cover is inserted into said locking channel.

4. The cap and cover assembly of claim 1, wherein said locking means includes first and second portions defining a locking tongue for insertion into said locking channel.

5. The cap and cover assembly of claim 1, wherein said locking channel includes opposed downwardly extending walls defining a continuous channel having an upper portion substantially parallel to said tailgate and an inwardly angled lower portion, said channel being open at its free end;
    said locking means including first and second portions defining a locking tongue for insertion into said locking channel with said first and second portions corresponding in shape to the first and second sections of said locking channel.

6. The cap and cover assembly of claim 5, wherein at least one of said walls of said locking channel includes at least one barb adapted to penetrate said locking tongue when said locking tongue is inserted into said locking channel.

7. The cap and cover assembly of claim 5, further including fastening means extending through said locking channel walls and said locking tongue to fixedly interconnect said cover and said cap.

8. The cap and cover assembly of claim 5, further including a sealing bead positioned between said locking channel and said tailgate to prevent the ingress of water between said cover and said tailgate and to prevent corrosion.

9. The cap and cover assembly of claim 1, further including fastening means for securing the bottom portion of said cover to said tailgate.

10. The cap and cover assembly of claim 1, further including a gasket means positioned between said cap and said tailgate to prevent corrosion.

11. A decorative cap and tailgate cover assembly adapted to be mounted to the tailgate of a pick-up truck; said cap substantially conforming to the contours of the upper portion of the tailgate and being bent over the outer panel of the tailgate and having a locking channel extending into the cargo area of the pick-up truck, said locking channel having substnatially parallel walls which are bent inwardly at their ends in the direction of said tailgate; said cover having an off-set upper portion which is configured to be received within said locking channel to interlock said cap and cover.

12. The cap and cover assembly of claim 11, wherein at least one of said walls of said locking channel includes a barb adapted to penetrate said cover when said cover is inserted into said locking channel.

13. The cap and cover assembly of claim 11, further including fastening means extending through said locking channel walls and said cover to fixedly secure said cover to said cap.

14. The cap and cover assembly of claim 11, further including a sealing bead positioned between said locking channel and said tailgate.

15. The cover and cap assembly of claim 11, further including fastening means for securing the bottom portion of said cover to said tailgate.

16. The cap and cover assembly of claim 11, further including a gasket means positioned between said cap and said tailgate to prevent corrosion.

17. A decorative tailgate cap and cover assembly adapted to be mounted to a pick-up truck tailgate having opposed inner and outer side panels, the decorative tailgate cap and cover assembly comprising:
    a decorative tailgate cap contoured to fit over the upper portion of the tailgate such that the sides of said cap bend over the side panels of the tailgate;
    a cover having a main body portion substantially configured to the shape of the inner panel of the tailgate; and
    locking means interlocking adjacent ends of the tailgate cover and decorative cap to facilitate installation and provide added protection to the tailgate.

18. The assembly of claim 17, wherein the locking means includes a locking channel extending from the cap adjacent the inner panel of the tailgate, the locking channel having an upper portion substantially parallel to said tailgate and an inwardly angled lower portion; and
    a locking tongue extending from the upper edge of the cover for insertion into said locking channel.

19. The assembly of claim 17, further including fastening means extending through said locking means to fixedly interconnect said cap and cover.

20. The assembly of claim 17, further including fastening means for securing the bottom portion of said cover to said tailgate.

* * * * *